United States Patent [19]
Narutaki et al.

[11] Patent Number: 5,528,401
[45] Date of Patent: Jun. 18, 1996

[54] LIQUID CRYSTAL DISPLAY DEVICE HAVING AN ORIENTATION LAYER CONTAINING LIQUID CRYSTAL WITH A CONTROLLED ORIENTATION AND METHOD FOR MANUFACTURING THE SAME

[75] Inventors: Yozo Narutaki; Yutaka Ishii, both of Nara; Yoshitaka Yamamoto, Yamatokoriyama, all of Japan

[73] Assignee: Sharp Kabushiki Kaisha, Osaka, Japan

[21] Appl. No.: 281,560

[22] Filed: Jul. 28, 1994

[30] Foreign Application Priority Data

Jul. 28, 1993 [JP] Japan ................. 5-186457

[51] Int. Cl.$^6$ ........................ G02F 1/1337
[52] U.S. Cl. ................ 359/76; 359/51; 359/75
[58] Field of Search ............... 359/51, 52, 75, 359/76

[56] References Cited

U.S. PATENT DOCUMENTS

| | | | |
|---|---|---|---|
| 5,073,294 | 12/1991 | Shannon et al. | 359/76 |
| 5,262,882 | 11/1993 | Hikmet | 359/75 |
| 5,270,843 | 12/1993 | Wang | 359/51 |
| 5,342,545 | 8/1994 | Yamada et al. | 359/51 |
| 5,368,770 | 11/1994 | Saupe et al. | 359/51 |

FOREIGN PATENT DOCUMENTS

63-129323   6/1988   Japan .
4-146414    5/1992   Japan .

*Primary Examiner*—Anita Pellman Gross
*Assistant Examiner*—James A. Dudek

[57] ABSTRACT

A liquid crystal display having a liquid crystal layer between substrates is provided with a liquid crystal orientation layer sandwiched between a substrate and the liquid crystal layer. The liquid crystal orientation layer is made of a mixture of liquid crystal molecules and a photo polymerizable compound. While projecting an ultraviolet ray so as to harden the photo polymerizable compound, a predetermined voltage set according to a desired pretilt angle is applied, thereby fixing the orientation of the liquid crystal molecules. The liquid crystal molecules of the liquid crystal layer are controlled so as to have an orientation direction set according to the pretilt angle of the liquid crystal orientation layer. The described liquid crystal orientation layer offers easy and accurate control of the pretilt angle. Therefore, for example, in the DAP mode liquid crystal display, a small pretilt angle can be set on an entire surface of the substrate, thereby achieving a high contrast display.

23 Claims, 4 Drawing Sheets

LIQUID CRYSTAL DISPLAY DEVICE HAVING AN ORIENTATION LAYER CONTAINING LIQUID CRYSTAL WITH A CONTROLLED ORIENTATION AND METHOD FOR MANUFACTURING THE SAME

FIELD OF THE INVENTION

The present invention relates to an information display device provided with a liquid crystal display as a display medium and also relates to a method for manufacturing the information display device.

BACKGROUND OF THE INVENTION

Various types of information display devices have been generally used such as CRT (cathode ray tube), fluorescent character display tube, EL (electroluminescence) displays. Recently, the liquid crystal displays which offer a thin structure and a low power consumption enjoy growing popularity in the field of word processors and notebook personal computers. A variety of formats (display modes) of the liquid crystal displays have been proposed to find ways to achieve more effective use of the liquid crystal displays as display devices.

For example, in a DAP (deformation of vertical aligned phases) mode, liquid crystal molecules are vertically aligned to a substrate surface using a liquid crystal having a negative $\Delta\epsilon$ (dielectric anisotropy), and liquid crystal cells are placed under cross nicol. In this arrangement, with the application of a threshold voltage or above threshold voltage to the liquid crystal cells, a molecular axis is tilted with respect to an electric field, and an optical axis of the liquid crystal molecules is displaced from the polarization axis. As a result, a double-refraction effect is generated, and thus light is transmitted. On the other hand, when a voltage is not applied, apparently, a single refraction index exists. Thus, light transmitted through the first polarizer is completely shut off by the second polarizer and thus it is not transmitted. As described, when a voltage is not applied, a transmittance is very low, thereby achieving a high contrast display in the DAP mode.

Whereas, only by simply aligning the liquid crystal molecules vertically to the substrate surface, the liquid crystal molecules are randomly tilted with the application of a voltage. As a result, many areas having different tilt angles of the molecules are formed. The areas present not only the problem of different transmittances but also present the problem of unsuccessive orientation of the molecules which causes dispersion of light on a boundary between areas. In order to prevent the described problems, it is required to align the liquid crystal molecules beforehand so as to be tilted from a direction of a substrate normal. Furthermore, if this tilt angle (hereinafter referred to as a pretilt angle) becomes too large, light may be transmitted by the double refraction effect as generated with an application of the voltage, which causes the contrast to be lowered. Therefore, it is preferable to set the pretilt angle as small as possible.

In order to achieve the described orientation, conventionally for example, a method in which vertical orientation process is carried out after subjecting a polyimide film (parallel orientation film) to a rubbing process is known as disclosed in Japanese Laid Open Patent Publication No. 167123/1981 (Tokukaisho 56-167123). According to this method, after rubbing the surface of a polyimide high polymer, the substrate is dipped in a solution of silane surface active agent dissolved in an organic solvent, and the substrate is calcined, thereby obtaining a film of the silane surface active agent. This method offers a pretilt angle of 2°–4°.

Whereas the method disclosed in the U.S. Pat. No. 919155 offers a pretilt angle of 0.5°–6° which is an effective orientation method in the DAP mode. According to this method, after evaporating SiO in a direction forming an angle of 30° with respect to the substrate plane, the substrate is rotated at 90° so as to carry out the second evaporation in a direction forming an angle of 5° with respect to the substrate surface, and the substrate is placed under long-chain alcohol which is heated to 140° C. for two hours.

Other than the DAP mode, liquid crystal displays of the TN (twisted nematic) mode, STN (super twisted nematic) mode, etc., have been practically used in a variety of fields. However, described formats present a deficiency that the display can be seen differently depending on a viewing angle (viewing angle characteristic). The various techniques for achieving improvements in the viewing angle characteristic have been proposed such as a method for varying a threshold voltage among picture elements and a method for varying the direction of the orientation of the liquid crystal molecules and the size of the pretilt angle per every picture element (see Kalluri et al. 1993 Society for Information Display International Symposium (SID'91), Y. Koike et al. 1992 Society for Information Display International Symposium (SID'92), K.Takatori et al. Japan display'92).

For the described reasons, the pretilt angle is required to be made as small as possible in the DAP mode. Therefore, when the DAP mode is applied to liquid crystal projection which especially requires high contrast, it is necessary to set the pretilt angle to 1° or below. Therefore, it is not feasible with the method disclosed in the Japanese Laid-Open Patent Publication No. 167123/1981 (Tokukaisho 56-167123).

The method disclosed in the U.S. Pat. No. 919155 offers a pretilt angle of 0.5°. However, the evaporation process adopted in this method is a so-called oblique evaporation, which requires a vacuum condition. Moreover, the method presents the problem that it is difficult to uniformly align a depositing angle of SiO molecules on an entire surface of the substrate, which results in the deterioration of display evenness due to the variation in the pretilt angle. As described, there has not been found the way to apply the method on an industrial basis.

The conventional techniques for achieving improvements in the viewing angle characteristics are complex by requiring the following processes:

(1) rubbing an orientation layer, masking part of the orientation layer with a resist after carrying out the orientation treatment, and removing the resist after carrying out the second rubbing process at an angle different from the first rubbing process; and (2) forming orientation layers of two kinds having different pretilt angles by repeating a photolithographic printing process twice.

As described, the described manufacturing processes are complex because the photolithographic printing process is required once or twice. Moreover, the process is carried out on the orientation layer which the liquid crystal is in direct contact with. Therefore, the problem is presented in that the pretilt angle varies due to the photo resist and separation liquid used in the photolithographic printing process. In the case of applying the described methods to the TFT (thin film transistor) liquid display, an adverse effect occurs such as a drop in the voltage holding ratio, etc., due to the residues of the photo-resist and the separation liquid. Furthermore, the control of the pretilt angle is limited by the materials for the liquid crystal and the orientation layer.

As described, any of the described techniques fail to offer an accurate and easy control of the pretilt angle. Therefore, it is difficult to achieve a high contrast display and improvements in the viewing angle characteristic.

SUMMARY OF THE INVENTION

The first object of the present invention is to provide an information display device which exhibits a high contrast display by controlling a pretilt angle accurately and easily.

In order to achieve the above object, the information display device in accordance with the present invention is characterized in that a liquid crystal orientation layer made of a mixture of a solid substance and liquid crystal molecules having a predetermined orientation direction is formed between a liquid crystal layer and a substrate.

The present invention having the above arrangement is also characterized in that the solid substance is a polymerizable high polymer compound.

According to the described arrangement, the liquid crystal orientation layer made of a mixture of a solid substance and liquid crystal molecules having a predetermined orientation direction is formed between the substrate and the liquid crystal layer. Therefore, the liquid crystal molecules in the liquid crystal layer orient in accordance with the orientation direction of the liquid crystal molecules in the liquid crystal orientation layer, i.e., according to the pretilt angle of the liquid crystal molecules. For the solid substance, for example, a photo polymerizable high polymer compound or thermal polymerizable high polymer compound may be used. In the case of the described liquid crystal orientation layer, while photo or thermal polymerizable high polymer is being polymerized and hardened by the projection of light or the application of heat, for example, a voltage is applied so that the liquid crystal molecules in the liquid crystal orientation layer form a predetermined pretilt angle, thereby fixing the orientation of the liquid crystal molecules in the liquid crystal orientation layer at a desired pretilt angle.

As the described information display device offers an easy and accurate control of the pretilt angle of the liquid crystal orientation layer, the pretilt angle of the liquid crystal molecules in the liquid crystal layer also can be controlled easily and accurately. Therefore, for example, in the liquid crystal display of the DAP mode, the liquid crystal molecules on the entire surface of the substrate can be uniformly controlled at a small pretilt angle, thereby achieving a high contrast display.

The second object of the present invention is to provide an information display device which exhibits an excellent viewing angle characteristic by controlling a pretilt angle accurately and easily.

In order to achieve the above object, the information display device of the present invention having the previously described arrangement is characterized in that the liquid crystal orientation layer includes liquid crystal molecules having mutually different orientation directions.

According to the above arrangement, the liquid crystal orientation layer includes liquid crystal molecules having different orientation directions, and liquid crystal orientation layer offers an easy and accurate control of the pretilt angle of the liquid crystal molecules. Therefore, aiming to achieve improvements in the viewing angle characteristic, when the liquid crystal molecules are set so as to have different pretilt angles for respective predetermined areas randomly set, the orientations of the respective liquid crystal molecules in the divided areas can be easily set at respective desired pretilt angles without requiring a complex manufacturing process.

The third object of the present invention is to provide a method for manufacturing an information display device which offers an accurate and easy control of a pretilt angle.

In order to achieve the above object, the method for manufacturing the information display device in accordance with the present invention is characterized by including the steps of: forming a liquid crystal orientation layer made of a mixture of a polymerizable high polymer and liquid crystal molecules on a substrate, and controlling the orientation direction of the liquid crystal molecules in the liquid crystal orientation layer at a predetermined angle while polymerizing the polymerizable high polymer.

According to the described method, in controlling the orientation of the liquid crystal molecules in the liquid crystal orientation layer to be set at a desired pretilt angle while polymerizing the polymerizable high polymer, for example, a magnetic field set according to the desired pretilt angle is applied, thereby fixing the orientation direction of the liquid crystal molecules. Therefore, the orientation of the liquid crystal molecules in the liquid crystal orientation layer can be set in a desired direction without carrying out a uni-axial orientation treatment on the substrate through a rubbing process, thereby achieving a simplified manufacturing process of the information display device.

The invention and its various advantages will become more apparent to those skilled in the art from the ensuing detailed description of preferred embodiments, reference being made to the accompanying drawings.

BRIEF DESCRIPTION OF THE DRAWINGS

FIGS. 1(a)–(d) through FIGS. 4(a)–(c) show one embodiment of the present invention.

DETAILED DESCRIPTION OF PREFERRED EMBODIMENTS

[EMBODIMENT 1]

The following description will discuss one embodiment of the present invention in reference to FIGS. 1(a) through 1(d).

Figure 1A:
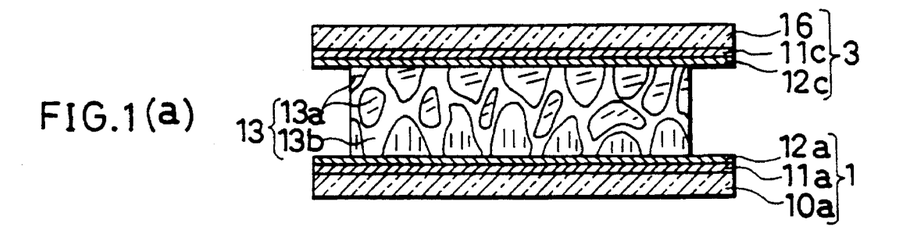
FIGS. 1(a)–(d) are typical depictions which explain manufacturing processes of the liquid crystal display in accordance with one embodiment of the present invention.
Figure 1B:
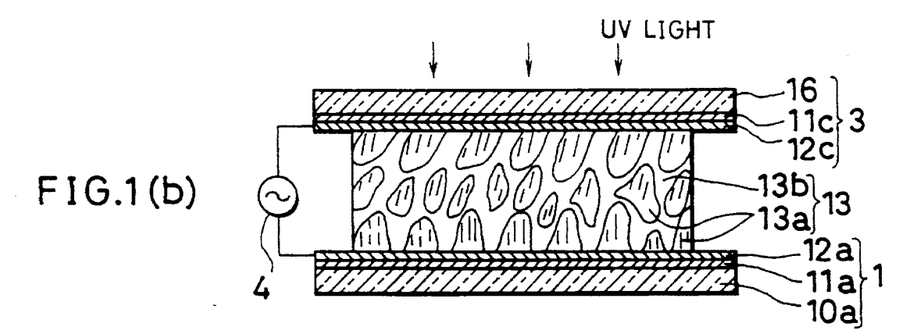
Figure 1C:
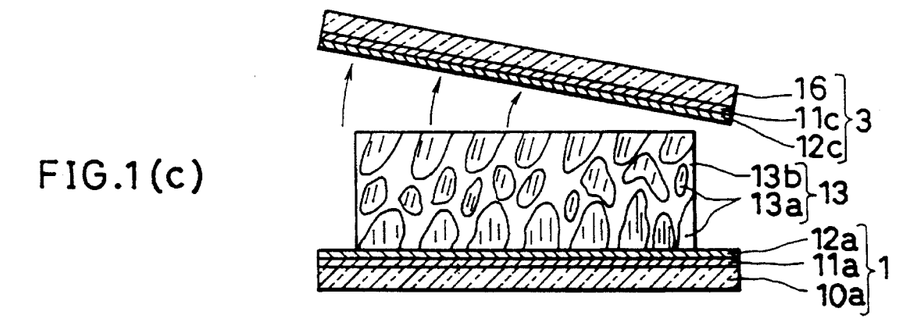
Figure 1D:
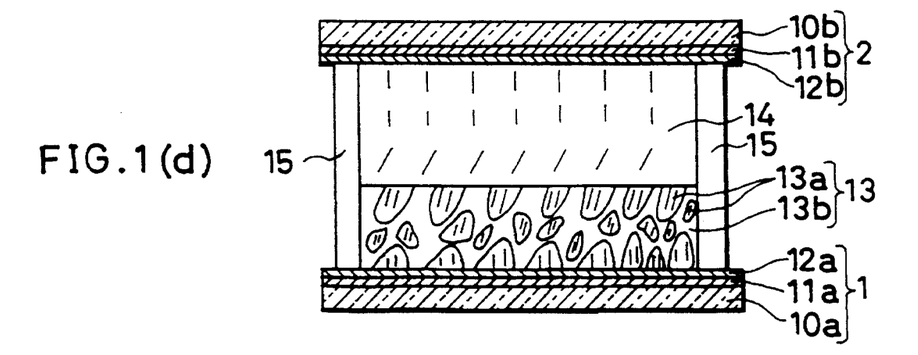

As shown in FIG. 1(d), a liquid crystal display (information display device) of the present embodiment provided with a pair of upper and lower substrates 1 and 2 respectively composed of transparent substrates 10a and 10b whereon transparent electrodes 11a and 11b and orientation films 12a and 12b are formed in this order. The substrates 1 and 2 are formed so as to face one another with a predetermined gap set by a spacer 15 between them. In this arrangement, the respective orientation films 12a and 12b also face one another. On the orientation film 12a of the substrate 1, a liquid crystal orientation layer 13 made of a mixture of a liquid crystal 13a and a photo polymerizable compound (solid substance) 13b is formed. A liquid crystal layer 14 is sandwiched between the liquid crystal orientation layer 13 and the orientation film 12b of the substrate 2.

The manufacturing processes for the liquid crystal display having the above arrangement will be explained below.

First, 0.05 g of Irgacure 184 (available from Ciba-Geigy) as an ultraviolet hardening agent is added to a mixture of 4.3 g of liquid crystal ZLI 1701 (available from E. Merck) having a positive dielectric anisotropy, 0.2 g of TMPT (trimethylpropane triacrylate available from SHIN-NAKA-MURA CHEMICAL CO., LTD) and 0.5 g of 2-ethylhexylacrylate (available from NIPPON KAYAKU CO., LTD), and the mixture is uniformly mixed at 80°C. Then, a spacer of 1 micron is added to the mixture so as to be uniformly dispersed therein. As a result, a mixture to be used in forming the liquid crystal orientation layer 13 is prepared.

Then, as shown in FIG. 1(a), two transparent substrates 10a and 16 made of, for example, glass are prepared, and ITO (indium tin oxide) films are formed on respective transparent substrates 10a and 16, thereby obtaining transparent electrodes 11a and 11c. Then, on the transparent electrode 11a, an orientation film 12a made of a vertical orientation polyimide (available from Nippon Synthetic Rubber Co., Ltd.) is formed, while on the transparent electrode 11c, an orientation film 12c made of a parallel orientation polyimide (available from Nippon Synthetic Rubber Co., Ltd.) is formed, and a rubbing treatment is carried out on each of the orientation films 12a and 12c, thereby respectively forming the substrate 1 provided with the transparent substrate 10a whereon the transparent electrode 11a and the orientation film 12a are formed, and a substrate 3 provided with the transparent substrate 16 whereon the transparent electrode 11c and the orientation film 12c are formed.

The two substrates 1 and 3 thus formed are mechanically fixed with the previously described mixture sandwiched between them. Thereafter, as shown in FIG. 1(b), a predetermined voltage is applied from a power source 4 so that the pretilt angle of liquid crystal molecules existing on the interface between the mixture and the substrate 3° is set to 1°. While maintaining this state, an ultraviolet ray of 20 mW/cm$^2$ is projected using a high pressure mercury lamp (not shown). As a result, the photo polymerizable compound 13b is polymerized and hardened, and the orientation of the liquid crystal 13a is fixed. Here, since the rubbing treatment is carried out on the orientation film 12c of the substrate 3, the tilt angle of the liquid crystal 13a in the liquid crystal orientation layer 13 can be controlled in one direction when a voltage is applied.

Next as shown in FIG. 1(c), after separating the substrate 3 from the liquid crystal orientation layer 13 on the substrate 1, the substrate 1 is washed with acetone so as to extract the liquid crystal 13a from the liquid crystal orientation layer 13. Separately from the substrates 1 and 3, as shown in FIG. 1(d), the transparent electrode 11b made of the ITO (indium tin oxide) film and the vertical orientation film 12b are formed on the transparent substrate 10b so as to form the substrate 2. Further, the substrate 2 is laminated with the substrate 1 provided with the liquid crystal orientation layer 13 with the spacer 15 of 5 microns between them so as to form liquid crystal cells. Lastly, a liquid crystal ZLI 4788-100 (available from E. Merck) having a negative dielectric anisotropy is injected into the obtained liquid crystal cells so as to form a liquid crystal layer 14. As a result, a liquid crystal display is obtained.

In the described manufacturing processes, a matrix is formed in the photo polymerizable compound 13b of the liquid crystal orientation layer 13. Therefore, the liquid crystal molecules in the liquid crystal layer 14 can maintain a predetermined pretilt angle on the entire surface of the substrate. Namely, by preparing the liquid crystal display element using the liquid crystal orientation layer 13 remaining on the substrate 1 after separating the substrate 3, the liquid crystal molecules in the liquid crystal layer 14 are affected by the orientation of the liquid crystal 13a in the liquid crystal orientation layer 13. As a result, the liquid crystal molecules in the liquid crystal layer 14 orients at a predetermined pretilt angle.

A liquid crystal display was actually manufactured by the described manufacturing processes and was observed while applying a predetermined voltage. As a result, the liquid display element shows the desirable display characteristic with excellent contrast.

[EMBODIMENT 2]

The following descriptions will discuss another embodiment of the present invention in reference to FIGS. 2(a) through 2(d). For convenience in the explanations, members having the same functions as those in the previous embodiment will be designated by the same reference numerals, and thus the descriptions thereof shall be omitted here.

Figure 2A:
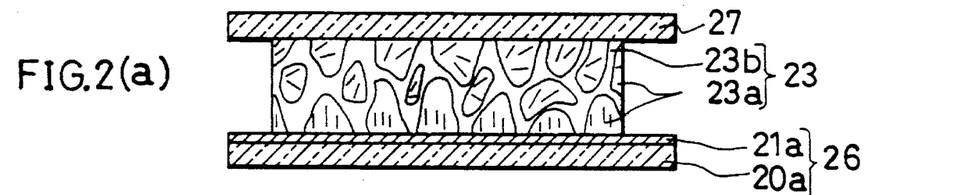
FIGS. 2(a)–(d) are typical depictions which explain manufacturing processes of liquid crystal display in accordance with another embodiment of the present invention.
Figure 2B:
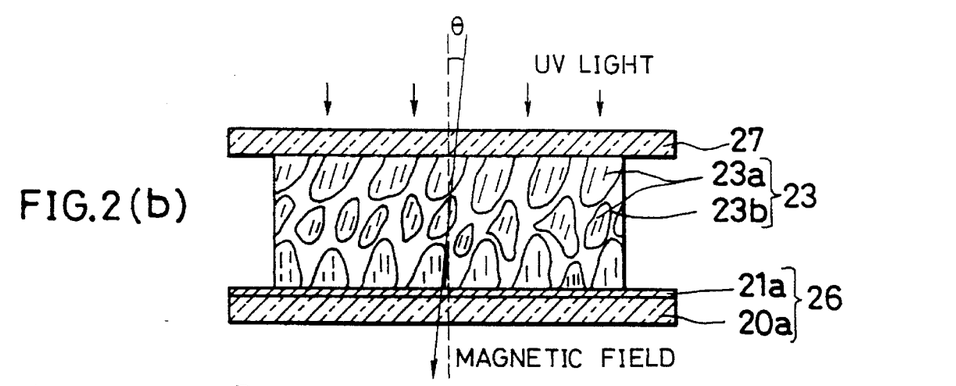
Figure 2C:
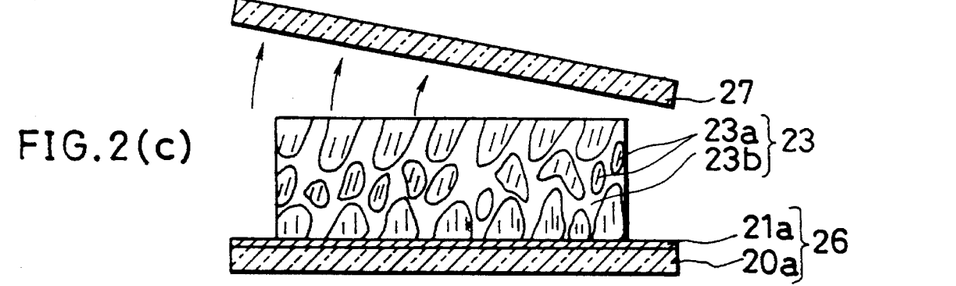
Figure 2D:
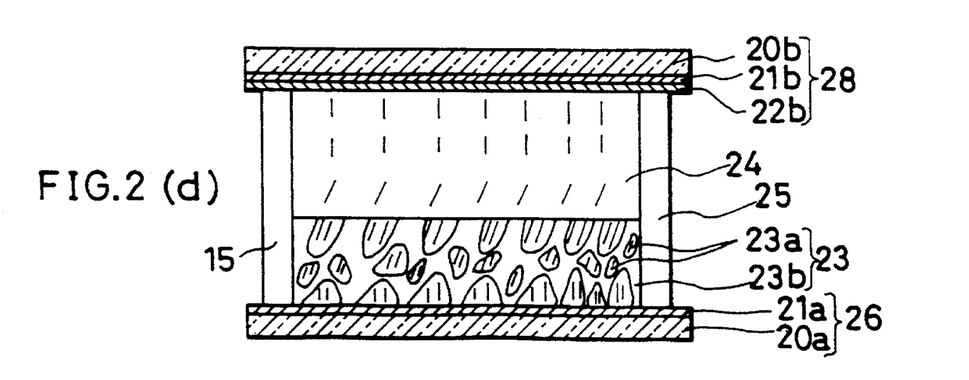

As shown in FIG. 2(d), the liquid crystal display of the present embodiment has the same arrangement as the previous embodiment 1 except that a lower substrate 26 is not provided with an orientation film. In the manufacturing processes of the liquid crystal display of the present embodiment, the liquid crystal orientation layer 23 provided between substrates 26 and 27 is formed by a different process from that of the previous embodiment 1.

The manufacturing processes for the liquid crystal display having the described arrangement will be explained below in detail, First, a mixture including a liquid crystal 23a and a photo polymerizable compound 23b to be used in forming the liquid crystal-orientation layer 23 is prepared using the same material and method as the previous embodiment 1. As shown in FIG. 2(a), a transparent electrode 21a is formed on the surface of a transparent substrate 20a so as to form the substrate 26. The substrate 26 and the substrate 27 whereon a transparent electrode is not provided are mechanically fixed with the mixture sandwiched between them. Thereafter, as shown in FIG. 2(b), a static magnetic field of 300000 Gauss is applied from a direction (denoted by 8 in FIG. 2(b)) tilted by 1° from a substrate normal. While maintaining this state, an ultraviolet ray of 20 mW/cm$^2$ is projected using a high pressure mercury lamp (not shown).

As a result, a photo-polymerizable compound 23b is polymerized and hardened, and the liquid crystal 23a is fixed in a desirable orientation. As described, by forming the liquid crystal orientation layer 23 with the application of the static magnetic field in a direction tilted by 1° from the substrate normal, the tilt direction of the liquid crystal 23a in the liquid crystal orientation layer 23 can be controlled in one direction without forming orientation films on the substrates 26 and 27.

Next, as shown in FIG. 2(c), after separating the substrate 27 from the liquid crystal orientation layer 23, the liquid crystal orientation layer 23 is washed with acetone so as to extract the liquid crystal 23a from the liquid crystal orientation layer 23. Separately from the substrate 26, as shown in FIG. 2(d), the transparent electrode 21b and the vertical orientation film 22b are formed on the transparent substrate 20b, thereby obtaining a substrate 28. Further, the substrate 28 is laminated with the substrate 26 provided with the liquid crystal orientation layer 23 with a spacer 25 of 5 microns between them, thereby forming a liquid crystal cell. Lastly, a liquid crystal ZLI 4788–100 (available from E. Merck) having a negative dielectric anisotropy is injected into the liquid crystal cell so as to form a liquid crystal layer 24. As a result, a liquid crystal display is obtained In the described manufacturing process, a matrix is formed in the photo-polymerizable compound 23b of the liquid crystal orientation layer 23. Therefore, the liquid crystal molecules in the liquid crystal layer 24 can maintain a predetermined pretilt angle on the entire surface of the substrate. Namely, by preparing the liquid crystal display element using the liquid crystal orientation layer 23 remaining on the substrate 26 after separating the substrate 28, the liquid crystal molecules in the liquid crystal layer 24 are affected by the orientation of the liquid crystal 23a in the liquid crystal orientation layer 23. As a result, the liquid crystal molecules in the liquid crystal layer 24 orient at a predetermined pretilt angle.

The liquid crystal display element was actually manufactured by the described manufacturing processes and was observed while applying a predetermined voltage. As a result, the liquid crystal display element shows desirable display characteristics with excellent contrast.

In the manufacturing processes in accordance with the present embodiment, as a pretilt angle is controlled using the magnetic field, an orientation treatment is not required. However, even with the orientation treatment, the same effect can be achieved.

In the described embodiments 1 and 2, the magnetic field and electric field are respectively used in controlling the pretilt angle separately. However, both of the magnetic field and the electric field may be used in one time if necessary.

[EMBODIMENT 3]

The following descriptions will discuss still another embodiment of the present invention in reference to FIGS. 3(a) through 3(d). For convenience in the explanations, members having the same functions as those in the previous embodiments will be designated by the same reference numerals, and thus the descriptions thereof shall be omitted here.

Figure 3A:
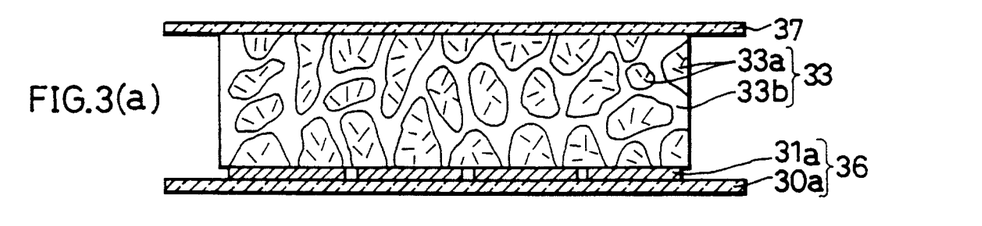
FIGS. 3(a)–(d) are typical depictions which explain manufacturing processes of liquid crystal display in accordance with still another embodiment of the present invention.
Figure 3B:
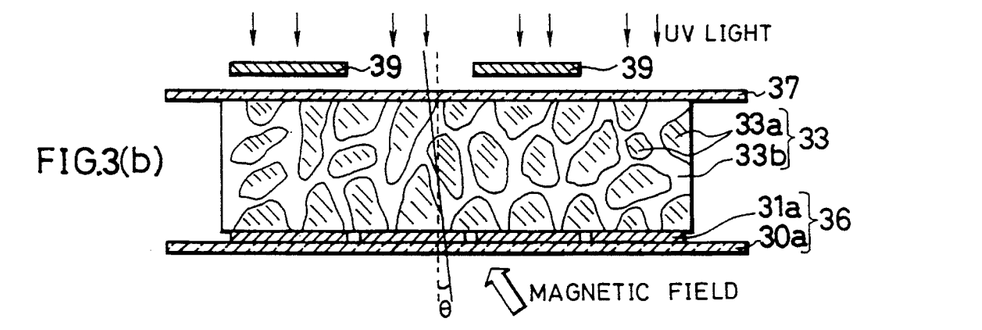
Figure 3C:
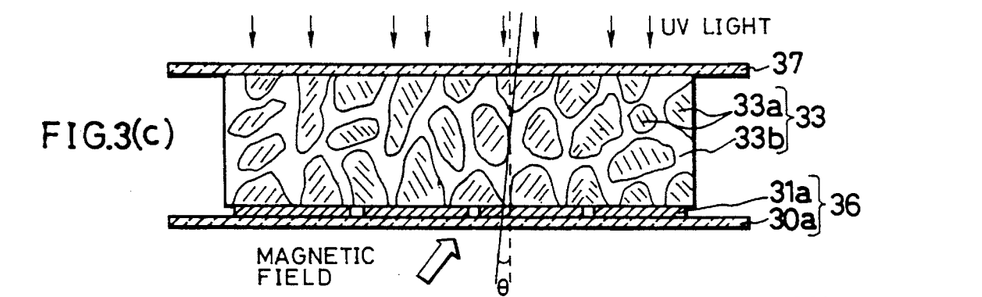
Figure 3D:
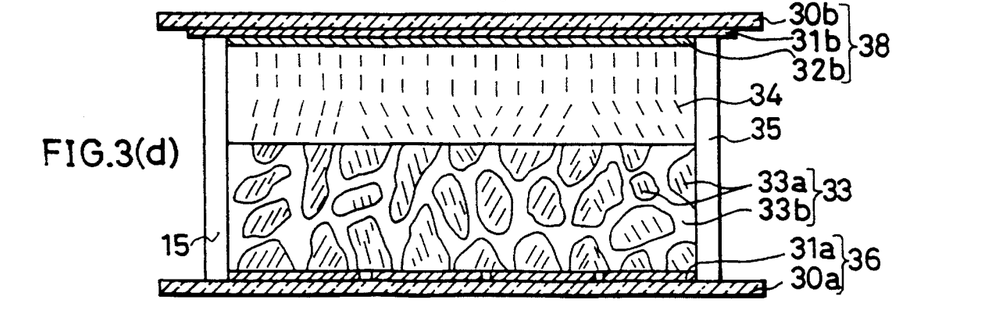

As shown in FIG. 3(d), the liquid crystal display of the present embodiment has almost the same arrangement as the previous embodiment 2 except that a lower substrate 36 provided with a stripe shaped ITO (indium tin oxide) electrode 31a is used. In the manufacturing processes, a liquid crystal orientation layer 33 having a liquid crystal 33a and a photo polymerizable compound 33b is manufactured by a different method from the previous embodiment 2.

The manufacturing processes for the liquid crystal display having the described arrangement will be explained below.

First, 0.09 g of Irgacure 184 (available from Ciba-Geigy) as an ultraviolet hardening agent is added to a mixture of 7.7 g of liquid crystal ZLI 4788-100 (available from E. Merck) having a negative dielectric anisotropy, 0.4 g of TMPT (trimethylpropane triacrylate: available from SHIN-NAKAMURA CHEMICAL CO., LTD.) and 0.9 g of 2-ethylhexylacrylate (available from NIPPON KAYAKU CO., LTD.), and the mixture is uniformly mixed at 80° C. Then, a spacer of 1 micron is added to the mixture so as to be uniformly dispersed therein. As a result, a mixture of the liquid crystal 33a and a photo polymerizable compound 33b used in forming the liquid crystal orientation layer 33 is prepared.

Then, as shown in FIG. 3(a), a transparent electrode 31a made of a stripe shaped ITO film is formed on a surface of a transparent substrate 30a so as to form a substrate 36. Here, the substrate 36 may be arranged so as to be provided with an orientation film on the transparent electrode 31a if necessary. The substrate 36 and the substrate 37 whereon a transparent electrode is not provided are mechanically fixed with the previously described mixture sandwiched between them. Thereafter, as shown in FIG. 3(b), a static magnetic field of 300000 Gauss is applied so that the liquid crystal molecules form a pretilt angle of 3°.

While maintaining this state, an ultraviolet ray of 20 mW/cm$^2$ is projected from a high pressure mercury lamp (not shown) with a mask 39 placed above the substrate 37. The mask 39 enables the ultraviolet ray to be selectively projected only to the area to be controlled at a pretilt angle of 3°. In the meantime, with the application of the static magnetic field, the photo-polymerizable compound 33b can be partially polymerized and hardened, and the liquid crystal 33a is maintained at the first pretilt angle.

Next, the mask 39 is removed, and as shown in FIG. 3(c), the magnetic field having an opposite direction to that of the first process is applied so as to set the orientation of the residual liquid crystal 33a at the second pretilt angle. In the meantime, an ultraviolet ray is projected onto an entire surface so as to polymerize and harden the unreacted portion of the photo-polymerizable compound 33b. As a result, the areas having different tilt directions of the liquid molecules are selectively formed in the liquid crystal orientation layer 33 on the same substrate.

Next, after separating the substrate 37 from the liquid crystal orientation layer 33, the liquid crystal orientation layer 33 is washed with acetone so as to extract the liquid crystal 33a from the liquid crystal orientation layer 33. Separately from the substrate 36, as shown in FIG. 3(d), the transparent electrode 31b and the vertical orientation film 32b are formed on the transparent substrate 30b so as to prepare a substrate 38. Further, the substrate 38 is laminated with the substrate 36 provided with the liquid crystal orientation layer 33 with a spacer 35 of 5 microns between them, thereby obtaining a liquid crystal cell. Lastly, the liquid crystal ZLI 4788-100 is injected into the liquid crystal cell so as to form a liquid crystal layer 34. As a result, a liquid crystal display is obtained.

The liquid crystal display element was actually manufactured by the described manufacturing processes and was observed while applying a predetermined voltage. As a result, the liquid crystal display element shows desirable display characteristics with excellent contrast.

In the liquid crystal display element thus prepared, the orientation of the liquid crystal molecules in the liquid crystal layer 34 are affected by the liquid crystal orientation layer 33 formed so as to maintain a predetermined pretilt angle. Using the described technique, the pretilt angle and the tilt direction with respect to the specific portion of the display area on the substrate can be easily controlled. Furthermore, when the pretilt angles are different, the respective threshold voltages becomes also different. Therefore, in the mode having the viewing angle dependence, an angle offering an undesirable display condition can be compensated among picture elements. Namely, the improvement in the viewing characteristics can be easily achieved. Additionally, by changing not only the tilt angle but also the tilt direction, the greater contribution to the improvements in the viewing angle characteristic can be achieved.

In the present embodiment, the magnetic field is used for controlling the orientation state of the liquid crystal molecules. However, an electric field may be used as well. In the case of using the electric field, it is preferably arranged such that an electrode is formed on the substrate 36, and that an electric field which is set differently for each picture element can be applied simultaneously to the substrate 36 or the substrate 37 because the arrangement permits the masking treatment to be eliminated in projecting an ultraviolet ray, thereby achieving a simplified manufacturing process for the liquid crystal display. It may be arranged such that the same liquid crystal orientation layer 33 as the substrate 36 is formed also on the substrate 37 so as to have a predetermined pretilt angle.

[EMBODIMENT 4]

Figure 4A:
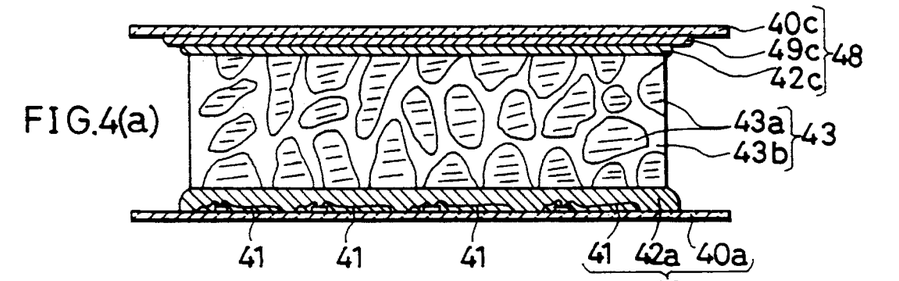
FIGS. 4(a)–(c) are typical depictions which explain manufacturing processes of liquid crystal display in accordance with still another embodiment of the present invention.
Figure 4B:
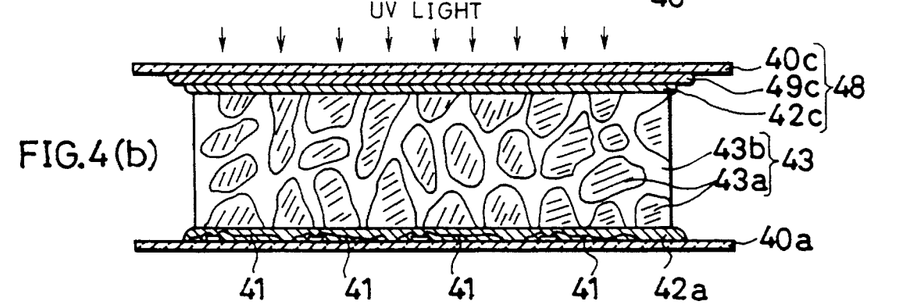
Figure 4C:
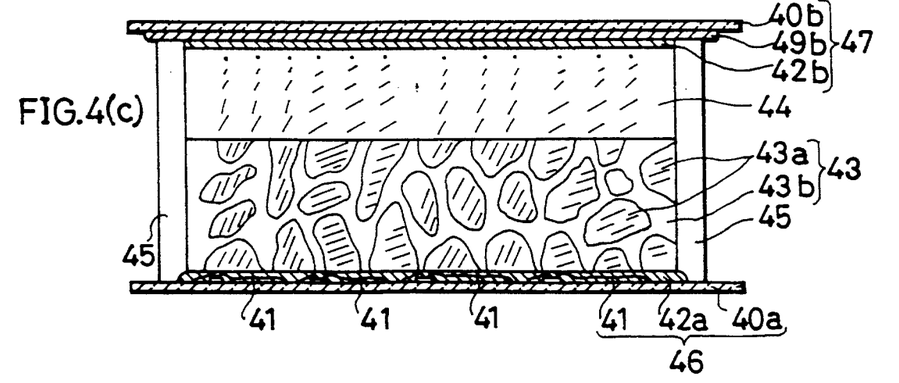

The following descriptions will discuss still another embodiment of the present invention in reference to FIGS. 4(a) through 4(c). For convenience in the explanations, members having the same functions as those in the previous embodiments will be designated by the same reference numerals, and thus the descriptions thereof shall be omitted here.

As shown in FIG. 4(c), the liquid crystal display of the present embodiment is a TFT type wherein a TFT element 41 is formed on a transparent substrate 40a, and an orientation film 42a made of a parallel orientation polyimide is formed so as to cover the TFT element 41 from the surface thereof. Other than the above, the liquid crystal display in accordance with the present embodiment has almost the same arrangement as the liquid crystal display in accordance with the previous embodiment 3.

Manufacturing processes for the liquid crystal display having the described arrangement will be explained below in detail.

First, 0.09 g of Irgacure 184 (available from Ciba-Geigy) as an ultraviolet hardening agent is added to a mixture of 7.7 g of liquid crystal ZLI 1701 (available from E. Merck) having a positive dielectric anisotropy, 0.4 g of TMPT (trimethylpropane triacrylate: available from SHIN-NAKAMURA CHEMICAL CO., LTD.) and 0.9 g of 2-ethylhexylacrylate (available from NIPPON KAYAKU CO., LTD.), and the mixture is uniformly mixed at 80 ° C. Then, a spacer of 1 micron is added to the mixture so as to be uniformly dispersed therein. As a result, a mixture 43 of a liquid crystal 43a and a photo-polymerizable compound 43b is prepared.

Then, as shown in FIG. 4(a), a transparent electrode 49c is formed on a transparent substrate 40c. Further, a parallel orientation polyimide is applied onto the surface of the transparent electrode 49c by a spin coat method and calcined. Thereafter, the orientation film 42c is formed by carrying out a uni-axial orientation treatment through a rubbing process, thereby forming a substrate 48. The TFT element 41 is formed on the transparent substrate 40a, and further, the orientation film 42a is formed thereon in the same manners as the orientation film 42c, thereby obtaining a substrate 46. Then, the substrates 46 and 48 thus obtained are mechanically fixed with the described mixture sandwiched between them.

In this state, as shown in FIG. 4(b), a voltage is applied from the TFT element 41 so that the liquid crystal molecules in the mixture form a pretilt angle of 2° or 5° with respect to the substrate surface, in the meantime, an ultraviolet ray of 20 mW/cm$^2$ is projected using a high pressure mercury lamp (not shown). After separating the substrate 48, the mixture 43 is washed with acetone so as to extract the liquid crystal 43a.

Next, as shown in FIG. 4(c), a transparent electrode 49b and an orientation film 42b are formed on the transparent substrate 40b so as to prepare the substrate 47. Further, the substrate 47 is laminated with the substrate 46 with a spacer 45 of 5 microns between them so as to form a liquid crystal cell. By injecting the liquid crystal XLI 1701 into the liquid crystal cell, a liquid crystal display element can be obtained.

In the described manufacturing processes, by applying a voltage from the TFT element 41, the liquid crystal molecules in the liquid crystal orientation layer 43a can be set so as to have different pretilt angles for respective predetermined areas randomly set. Therefore, in the liquid crystal display thus manufactured, areas having different pretilt angles can be easily formed on one substrate.

The liquid crystal display was actually manufactured by the described manufacturing processes and was observed while applying a predetermined voltage. The obtained liquid crystal display element offered desirable display characteristics with an excellent viewing angle characteristic.

In the described embodiments 1–4, the liquid crystal material used in the liquid crystal orientation layer may be selected so as to be operable in each display mode. The photo polymerizable compound is not specified as long as the photo polymerizable monomer has an affinity with a liquid crystal to be combined. Example of the photo polymerizable compounds include derivatives of an acrylic acid, an ester of acrylic acid, etc. Instead of the photo polymerizable compound, a thermal polymerizable compound such as epoxy derivative may be used and the same effect can be ensured.

A technique for fixing the liquid crystal molecules in the photo or thermal polymerizable compound adopted in the present embodiment is known for the high polymer dispersed liquid crystal, for example, as disclosed in Japanese Laid-Open Patent Publication No. 98220/1992 (Tokukaihei 4-98220). In the high polymer dispersed liquid crystal, the liquid crystal molecules exist as droplet in the polymer of photo or thermal polymerizable compound, and in the droplet, the liquid crystal molecules are randomly aligned along the wall of the high polymer. Therefore, when a voltage is not applied, light is scattered, while when a voltage is applied, the liquid crystal molecules are aligned in the direction of the electric field (ordinary light), and the refraction index thereof becomes equal to that of the photo polymerizable compound, thereby obtaining a transparent state.

Conventionally, the high polymer dispersed liquid crystal having the described characteristic has been used as a display medium. However, in the present invention, it is used in applying the orientation of the liquid crystal. Therefore, the functions and the orientation state thereof are greatly different from the case of using the high polymer dispersed liquid crystal as a display medium.

In the case of using the high polymer dispersed liquid crystal as the display medium, the dispersion of the liquid crystal in a dark is aggressively used, while in the case of the present invention aiming to apply an orientation to the liquid crystal, it is necessary to set the scattering of light as small as possible because it is little variation in the polarization state is required, and thus a high ratio of the liquid crystal to the photo or thermal polymerizable compound is required. More specifically, the ratio of the liquid crystal to the photo or thermal polymerizable compound is preferably set within a range of 80–95% with a more preferable range being 90

−95%. Additionally, as the liquid crystal orientation layer is made thicker, the intensity of scattered light becomes higher, and accordingly, the intensity of the electric field or magnetic field required for controlling the pretilt angle of the liquid crystal molecules also become higher. Therefore, the thickness of the liquid crystal orientation layer is set to or below 1 micron.

In the described embodiments 1–4, explanations have been given through the nematic liquid crystal. However, the present invention is not limited to the nematic liquid crystal. For example, a smectic liquid crystal or a nematic liquid crystal wherein a dichroic coloring matter is added may be used. The present invention is also applicable to the liquid crystal display of other formats such as a DAP mode which requires vertical orientation, TN mode having parallel orientation, STN mode, SSFLCD (surface stabilizing ferroelectric liquid crystal device) mode using a ferroelectric liquid crystal, etc.

As described, the information display device in accordance with the present invention is arranged such that a liquid crystal orientation layer made of a mixture of a solid substance and liquid crystal molecules having a predetermined orientation direction is formed between the liquid crystal layer and the substrate.

The information display device is also arranged such that the solid substance is a polymerizable high polymer compound.

The liquid crystal orientation layer made of a mixture of the solid substance of photo polymerizable high polymer or thermal polymerizable high polymer and liquid crystal molecules offers accurate and easy control of the pretilt angle of the liquid crystal molecules. Therefore, for example, in the DAP mode liquid crystal display, a small pretilt angle can be set on an entire surface of the substrate, thereby achieving a high contrast display.

The information display device in accordance with the present invention may be arranged such that the liquid crystal orientation layer has liquid crystal molecules having different orientation directions.

As described, the liquid crystal orientation layer offers easy control of the pretilt angle of the liquid crystal molecules. Therefore, aiming to achieve improvements in the viewing angle characteristic, when the the liquid crystal molecules are set so as to have different pretilt angles for respective predetermined areas randomly set on one substrate, the orientations of the respective liquid crystal molecules in the divided areas can be easily set at respective desired pretilt angles without requiring a complex manufacturing process.

As described, according to the manufacturing process of the information display device of the present invention, the liquid crystal orientation layer made of a mixture composed of a polymerizable high polymer and liquid crystal molecules is formed on a substrate, and the liquid crystal molecules in the liquid crystal orientation layer are controlled so as to have a predetermined orientation direction by applying a magnetic field to the liquid crystal orientation layer while polymerizing the polymerizable high polymer.

Therefore, by fixing the orientation of the liquid crystal molecules with an application of the magnetic field according to the desired pretilt angle, a uni-axial treatment through a rubbing process on the substrate can be eliminated, thereby achieving a simplified manufacturing process of the information display device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information display device comprising:

a liquid crystal layer sandwiched between substrates;

plural voltage applying elements formed on at least one of said substrates for applying a voltage which controls an orientation direction of liquid crystal molecules; and a liquid crystal orientation layer including a mixture of a solid substance and liquid crystal molecules, said liquid crystal molecules having a predetermined orientation in accordance with a voltage applied by said plural voltage applying elements to said liquid crystal orientation layer during curing of said solid substance, said liquid crystal orientation layer being formed between said liquid crystal layer and said at least one of said substrates.

2. The information display device as set forth in claim 1, wherein:

the solid substance is a polymerized compound of a polymerizable high polymer.

3. The information display device as set forth in claim 2, wherein:

the polymerizable high polymer is a photo polymerizable high polymer.

4. The information display device as set forth in claim 2, wherein:

the polymerizable high polymer is a thermal polymerizable high polymer.

5. The information display device as set forth in claim 1, wherein:

said liquid crystal orientation layer includes liquid crystal molecules whose orientation directions are varied from one another by applying different voltages from different ones of said plural voltage applying elements to corresponding portions of said liquid crystal orientation layer.

6. The information display device as set forth in claim 1, wherein:

a ratio of the liquid crystal to the solid substance in said liquid crystal orientation layer is in a range of 90–95%.

7. A method for manufacturing an information display device having a liquid crystal layer sandwiched between substrates, comprising the steps of:

(a) forming a liquid crystal orientation layer made of a mixture of a polymerizable high polymer and liquid crystal molecules on at least one of said substrates; and (b) controlling an orientation direction of the liquid crystal molecules in said liquid crystal orientation layer at a predetermined angle while polymerizing the polymerizable higher polymer in accordance with a voltage applied by plural voltage applying elements located on one side of said liquid crystal orientation layer to said liquid crystal orientation layer.

8. The method for manufacturing the information display device as set forth in claim 7, wherein said step (a) is composed of the steps of:

(c) preparing the mixture of the polymerizable high polymer and the liquid crystal molecules;

(d) preparing substrates which sandwich the mixture; and (e) sandwiching the mixture between said substrates.

9. The method for manufacturing the information display device as set forth in claim 7, wherein the polymerizable high polymer in said step (a) is a photo polymerizable high polymer.

10. The method for manufacturing the information display device as set forth in claim 7, wherein the polymerizable high polymer in said step (a) is a thermal polymerizable high polymer.

11. The method for manufacturing the information display device as set forth in claim 7, wherein:

in said step (b), by applying a voltage to said liquid crystal orientation layer, the liquid crystal molecules are controlled so as to have a predetermined orientation direction, in the meantime, by projecting light to said liquid crystal orientation layer, the polymerizable high polymer is polymerized and hardened, thereby fixing the liquid crystal molecules and controlling the orientation direction of the liquid crystal molecules at a predetermined angle.

12. The method for manufacturing the information display device as set forth in claim 7, wherein:

in said step (b), by applying a voltage to said liquid crystal orientation layer, the liquid crystal molecules are controlled so as to have a predetermined orientation direction, in the meantime, by applying heat to said liquid crystal oreintation layer, the polymerizable high polymer is polymerized and hardened, thereby fixing the liquid crystal molecules and controlling the oreintation direction of the liquid crystal molecules at a predetermined angle.

13. The method for manufacturing the information display devices as set forth in claim 7, wherein:

in said step (b), by applying an electric field to said liquid crystal orientation layer, the liquid crystal molecules are controlled so as to have a predetermined orientation direction, in the meantime, by projecting light to said liquid crystal orientation layer, the polymerizable high polymer is polymerized and hardened, thereby fixing the liquid crystal molecules and controlling the orientation direction of the liquid crystal molecules at a predetermined angle.

14. The method for manufacturing the information display device as set forth in claim 7, wherein:

in said step (b), by applying an electric field to said liquid crystal layer, the liquid crystal molecules are controlled so as to have a predetermined orientation direction, in the meantime, by applying heat to said liquid crystal orientation layer, the polymerizable high polymer is polymerized and hardened, thereby fixing the liquid crystal molecules and controlling the orientation direction of the liquid crystal molecules at a predetermined angle.

15. A method for manufacturing an information display device having a liquid crystal layer sandwiched between substrates, comprising the steps of:

(a) forming a liquid crystal orientation layer made of a mixture of a polymerizing the polymerizable high polymer and liquid crystal molecules on at least on one of said substrates; and (b) controlling an orientation direction of the liquid crystal molecules in said liquid crystal orientation layer to be 1° while polymerizing the polymerizable high polymer by hardening the polymerizable high polymer by projecting an ultraviolet ray having an intensity of 20 mW/cm$^2$ while applying a voltage to said liquid crystal orientation layer so that the orientation direction of said liquid crystal molecules is set to 1°.

16. A method for manufacturing an information display device having a liquid crystal layer sandwiched between substrates, comprising the steps of:

(a) forming a liquid crystal orientation layer made of a mixture of a polymerizable high polymer and liquid crystal molecules on at least on one of said substrates; and (b) controlling an orientation direction of the liquid crystal molecules in said liquid crystal orientation layer at a predetermined angle by applying a static magnetic field to said liquid crystal orientation layer in a direction set to a desired pretilt angle of the liquid crystal molecules in said liquid crystal orientation layer wile polymerizing the polymerizable high polymer.

17. The method for manufacturing the information display device as set forth in claim 16, wherein:

in said step (b), by applying a magnetic field to said liquid crystal orientation layer, the liquid crystal molecules are controlled so as to have a predetermined orientation direction, in the meantime, by projecting light to said liquid crystal orientation layer, the polymerizable high polymer is polymerized and hardened, thereby fixing the liquid crystal molecules and controlling the orientation direction of the liquid crystal molecules at a predetermined angle.

18. The method for manufacturing the information display device as set forth in claim 16, wherein:

in said step (b), by applying a magnetic field to said liquid crystal orientation layer, the liquid crystal molecules are controlled so as to have a predetermined orientation direction, in the meantime, by applying heat to said liquid crystal orientation layer, the polymerizable high polymer is polymerized and hardened, thereby fixing the liquid crystal molecules and controlling the orientation direction of the liquid crystal molecules at a predetermined angle.

19. The method for manufacturing the information display device as set forth in claim 16, wherein:

in said step (b), the pretilt angle of the liquid crystal molecules in said liquid crystal orientation layer is controlled to be 1° by hardening the polymerizable high polymer by projecting an ultraviolet ray having an intensity of 20 mW/cm$^2$ to said liquid crystal orientation layer while a static magnetic field of 300000 Gauss is being applied to said liquid crystal orientation layer in a direction tilted from a substrate normal by 1°.

20. The method for manufacturing the information display device as set forth in claim 16, wherein:

in said step (b), said liquid crystal molecules are composed of first liquid crystal molecules and second liquid crystal molecules, a pretilt angle of said first liquid crystal molecules in said liquid crystal orientation layer is controlled to be 3° by hardening the polymerizable high polymer by projecting an ultraviolet ray having an intensity of 20 mW/cm$^2$ to said liquid crystal orientation layer which is partially masked, while a static magnetic field of 300000 Gauss is being applied to said liquid crystal orientation layer in a direction tilted from a substrate normal by 3°, and a pretilt angle of said second liquid crystal molecules in said liquid crystal orientation layer are controlled to be 3° in an opposite direction to the pretilt angle of said first liquid crystal molecules by hardening the polymerizable high polymer by projecting an ultraviolet ray having an intensity of 20 mW/cm$^2$ to said liquid crystal orientation layer from which a mask is removed, while a static magnetic field of 300000 Gauss is being applied to said liquid crystal orientation layer in a direction tilted from the substrate normal by 3° in an opposite direction to a case of controlling the pretilt angle of said first liquid crystal molecules, thereby forming different pretilt angles in respective areas on one substrate.

21. A method for manufacturing an information display device having a liquid crystal layer sandwiched between substrates, comprising the steps of:

(a) forming a liquid crystal orientation layer made of a mixture of a polymerizable high polymer and liquid crystal molecules on at least on one of said substrates;

(b) controlling an orientation direction of the liquid crystal molecules in said liquid crystal orientation layer at a predetermined angle while polymerizing the polymerizable high polymer; and (c) forming thin film transistor elements on said substrate, wherein said step (b) further comprises:

controlling the pretilt angle of the liquid crystal molecules in said liquid crystal orientation layer to be 2° or 5° by hardening the polymerizable high polymer by projecting an ultraviolet ray having an intensity of 20 $mW/c^2$, while applying a voltage onto said liquid crystal orientation layer so that the pretilt angle of the liquid crystal molecules is set to 2° or 5°.

22. A method for manufacturing an information display device having a liquid crystal layer sandwiched between substrates, comprising the steps of:

(a) forming a liquid crystal orientation layer made of a mixture of a polymerizable high polymer and liquid crystal molecules on at least on one of said substrate; and (b) controlling a pretilt angle of the liquid crystal molecules in said liquid crystal orientation layer to be 1° while polymerizing the polymerizable high polymer by hardening the polymerizable high polymer by projecting an ultraviolet ray having an intensity of 20 $mW/cm^2$ to said liquid crystal orientation layer while applying a static magnetic field of 300000 Gauss to said liquid crystal orientation layer in a direction tilted from a substrate normal by 1°.

23. A method for manufacturing an information display device having a liquid crystal layer sandwiched between the substrates, comprising the steps of:

(a) forming a liquid crystal orientation layer made of a mixture of a polymerizable high polymer and liquid crystal molecules on at least one of said substrates, said liquid crystal molecules being composed of first liquid crystal molecules and second liquid crystal molecules; and (b) controlling an orientation direction of said liquid crystal molecules in said liquid crystal orientation layer at a predetermined angle while polymerizing the polymerizable high polymer including controlling a pretilt angle of said first liquid crystal molecules in said liquid crystal orientation to be 3° by hardening the polymerizable high polymer by protecting an ultraviolet ray having an intensity of 20 $mW/cm^2$ to said liquid crystal orientation layer which is partially masked, while applying a static magnetic field of 300000 Gauss to said liquid crystal orientation layer in a direction tilted from a substrate normal by 3°, and controlling a pretilt angle of said second liquid crystal molecules in said liquid crystal orientation layer to be 3° in an opposite direction to the pretilt angle of said first liquid crystal molecules by hardening the polymerizable high polymer by projecting an ultraviolet ray having an intensity of 20 $mW/cm^2$ to said liquid crystal orientation layer from which a mask is removed, while a static magnetic field of 300000 Gauss is being applied to said liquid crystal orientation layer in a direction tilted from the substrate normal by 3° in an opposite direction to a case of controlling the pretilt angle of said first liquid crystal molecules, thereby forming different pretilt angles in respective areas on one substrate.

\* \* \* \* \*